(12) United States Patent
Lango et al.

(10) Patent No.: US 9,892,256 B1
(45) Date of Patent: Feb. 13, 2018

(54) THREAT DEFENSE TECHNIQUES

(71) Applicant: Bracket Computing, Inc., Mountain View, CA (US)

(72) Inventors: Jason A. Lango, Mountain View, CA (US); Dennis Ramdass, Mountain View, CA (US); James J. Voll, Palo Alto, CA (US)

(73) Assignee: Bracket Computing, Inc., Mountain View, CA (US)

( * ) Notice: Subject to any disclaimer, the term of this patent is extended or adjusted under 35 U.S.C. 154(b) by 0 days.

(21) Appl. No.: 15/483,971

(22) Filed: Apr. 10, 2017

(51) Int. Cl.
G06F 12/14 (2006.01)
G06F 21/55 (2013.01)
G06F 9/455 (2018.01)
G06F 21/56 (2013.01)
G06F 21/62 (2013.01)

(52) U.S. Cl.
CPC ........ *G06F 21/554* (2013.01); *G06F 9/45558* (2013.01); *G06F 21/56* (2013.01); *G06F 21/6218* (2013.01); *G06F 2009/45587* (2013.01); *G06F 2221/034* (2013.01)

(58) Field of Classification Search
None
See application file for complete search history.

(56) References Cited

U.S. PATENT DOCUMENTS 9,251,343 B1 * 2/2016 Vincent ................. G06F 21/566
2011/0047542 A1 * 2/2011 Dang ...................... G06F 9/468
718/1
2012/0255003 A1 * 10/2012 Sallam ................. G06F 21/554
726/23

* cited by examiner

*Primary Examiner* — Brandon Hoffman
(74) *Attorney, Agent, or Firm* — Hickman Palermo Becker Bingham LLP (57) ABSTRACT

In an approach, an intermediary guest manager operates within a virtual machine hosted by a host machine and managed by a hypervisor. The intermediary guest manager manages one or more guest operating systems operating within the virtual machine and implements one or more security services for the guest operating systems. The security services provided to the guest operating systems may include system call filtering, memory protections, secure memory dumps, and others. In some cases, the intermediary guest manager consults a threat defense policy which contains a number of records, where each record has one or more triggers representing suspicious activity and one or more actions to take in response to being triggered. When the intermediary guest manager identifies a request, such as a system call or memory access, that meets the trigger of a particular record, the intermediary guest manager executes the associated actions to remediate the suspicious activity.

20 Claims, 5 Drawing Sheets

THREAT DEFENSE TECHNIQUES

TECHNICAL FIELD

The present disclosure generally relates to techniques for identifying and countering security threats using an intermediary guest manager that sits between a guest operating system and a hypervisor.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Many enterprises and their computer systems utilize virtual machines provided by a virtual data center (VDC), such as a cloud service provider (CSP), and other virtualized resources, such as virtual storage, virtual computing resources, or virtual database resources that are accessible through the Internet. Such cloud services may provide a client with many benefits, such as reduced costs, easier scalability, and a reduced administrative burden. However, cloud services also pose new challenges for clients of these services, such as increased security risks. For example, malware, such as viruses, trojans, spyware, rootkits and so forth are constant threats to security. One way to fight against malware is to install antivirus software agents (or other "security agents") on the virtualized machine which then attempt to identify and/or counter malignant programs and processes. However, in many cases malware will try to circumvent the installed anti-virus software or prevent the anti-virus software from being effective. Furthermore, in a cloud environment, there are even cases where the CSP (or an administrator working for the CSP) may mistakenly identify the anti-virus software as a threat and kill the process executing the security agent. Security agents are generally very resource intensive and thus are often mistaken for a malfunctioning or malicious process by an administrator or software monitoring agent utilized by CSPs. Clients of such cloud services would benefit from solutions that minimize such disadvantages, while requiring low implementation cost and effort.

SUMMARY OF THE INVENTION

The appended claims may serve to summarize the invention.

DESCRIPTION OF EXAMPLE EMBODIMENTS

Methods for expanding security services for a guest of a virtual data center are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
   2.0 Example Operating Environment
   3.0 Threat Defense Policy
   4.0 Example Threat Defense Process Flow
   5.0 Threat Defense Examples
      5.1 System Call Filtering
      5.2 Memory Protection
      5.3 Secure Memory Dump
   6.0 Alternative Security Agent Design
   7.0 Implementation Mechanisms—Hardware Overview
   8.0 Extensions and Alternatives
   1.0 General Overview According to an embodiment, an intermediary guest manager operates within a virtual machine hosted by a host machine and managed by a hypervisor. The intermediary guest manager manages one or more guest operating systems operating within the virtual machine and implements one or more services for the guest operating systems. The intermediary guest manager may provide one or more of various advantages to a virtual data center (VDC) guest that expand on the services provided to the guest by the VDC. In this context, a virtual data center or VDC refers to any of one or more virtualized enterprise computer systems, virtual machine infrastructure in a private data center, computing, storage or networking resources in a private cloud, resources in a public cloud such as that offered by a cloud service provider (CSP), and hybrid cloud computing environments.

In some embodiments, the services provided by the intermediary guest manager may take the form of optimizations and/or expansions of functionality for the guest operating systems. For example, the guest operating system (or an application executing on the guest operating systems) may emit hypercalls to the hypervisor to take advantage of particular services. However, in some cases, the hypervisor may not be configured to provide the service associated with the particular hypercall a guest operating system may emit. Alternatively the hypervisor may expect the format of the hypercall to be different from the format emitted by the guest operating system. Under normal circumstances, this would cause an incompatibility between the guest operating system and the hypervisor upon which the guest operating system runs. The intermediary guest manager, by virtue of residing between the guest operating system and the hypervisor, can intercept communications and either provide the service itself or translate communications between the guest operating system and the hypervisor to the format expected by each entity. Additional details regarding expanding the services available to guest operating systems using an intermediary guest manager are described in Jason A. Lango et al., "Expansion Of Services For A Virtual Data Center Guest", U.S. Pat. No. 9,292,331 B2, issued on Mar. 22, 2016, the entire contents of which is hereby incorporated for all purposes as though fully stated herein.

However, the expansion of services provided by an intermediary guest manager are not limited to merely optimization and/or translation roles. The embodiments discussed below focus primarily on techniques for expanding the security services available to the guest operating system using an intermediary guest manager.

In some embodiments, the intermediary guest manager intercepts system calls emitted by applications executing on the guest operating system and filters those system calls for a number of security reasons. For example, system calls that would cause a process representing a security agent executing on the guest operating system to cease functioning may be identified and prevented from executing. As a result, security agents are at less risk of being disabled by a malicious program or a misguided CSP administrator. Other examples may include system calls that attempt to schedule programs at a higher or lower priority than a program of that type should ordinarily be allowed to run, system calls that represent writes to a protected read-only file, as well as others. In some embodiments, the intermediary guest manager consults a set of records representing suspicious behavior referred to as a "threat defense policy". Each record of the threat defense policy has a set of criteria representing suspicious behavior and a remedial action to take if that suspicious behavior is detected. Using the security agent case as an example, the record may indicate that system calls which specify to terminate a process matching the process ID of a known security agent meets the criteria and the remedial action to take in response is to ignore the system call. Other embodiments may also have drastically different remedial actions, such as sending a notification to an email account of an administrator, sending a false positive acknowledgment back to the program to "trick" the program into thinking the system call had been executed, and so forth. The remedial actions may be represented by logic or code which is executed when the criteria of the record is met to cause the remedial actions to be performed.

The interception of a system call may be performed by establishing "traps" into the guest operating system. In the field of operating systems, a trap (also sometimes referred to as an exception or fault) is an exceptional condition that results in a context switch to a monitoring program. In the context of virtualization, traps are often used by hypervisors or managers acting in a hypervisor-like capacity, such as the intermediary guest manager, to grab control of execution from the guest operating system when necessary. One issue that occurs in virtualization is when multiple operating systems share the same physical machine, but are not explicitly programmed to share that hardware environment with other operating systems. As a result, hypervisors and hypervisor-like managers often need to trap and emulate the effects of system calls (and other requests) that otherwise would be handled by the operating system to ensure that the guest operating systems do not conflict with one another. For example, if two operating systems attempt to utilize the same resource, such as a screen buffer, the hypervisor or manager may need to step in and emulate that function in a way which ensures a resolution of the potential conflict. This same system of traps may also be used by the intermediary guest manager to monitor system calls. By installing traps on system calls made by applications of the guest operating system, execution is forced back into the control of the intermediary guest manager. From that point that intermediary guest manager can then inspect the system call, compare the system call against the records of the threat defense policy, and determine whether or not a remedial action (such as ignoring the system call) needs to take place.

In some embodiments, the intermediary guest manager protects sensitive memory areas utilized by the guest operating system. Sensitive in this context refers to memory areas which are relied upon for critical operating system functions, such as a system call table. For instance, malware will often seek to overwrite portions of the system call table in order to hide from security agents. In effect, this causes the system calls a security agent would normally rely upon to scan files or memory to instead execute code implanted by the malware which then provides false information to the security agent.

Under normal circumstances, if the malware has penetrated to the point where access to such critical data structures is possible, the operating system would not be able to protect itself from code executing with sufficient permissions. However, since the intermediary guest manager is external to the operating system, the intermediary guest manager is capable of identifying writes to areas of memory that should never be overwritten. For example, when the guest operating system is booted, the intermediary guest manager can ascertain the regions of virtual memory utilized by the guest operating system. The intermediary guest manager may then read metadata that identifies critical structures. For example, the critical structures may represent regions of memory from some initial offset that is determined at boot time. If the intermediary guest manager receives a command, such as a page table update that would attempt to write to the previously identified critical data structures, the intermediary guest manager will prevent that command from executing. As a result, the guest operating system receives the technical benefit of having critical data structures that are protected regardless of the permissions the malware obtains within the guest operating system. The protections of critical or sensitive data structures may be represented in records of the threat defense policy which become triggered by memory updates/writes to regions of memory known to correspond to those data structures.

In some embodiments, the intermediary guest manager provides secure memory dumps in case of guest operating system failures. A memory dump is a process in which the contents of memory are stored in case of an application or system crash. Memory dumps help software developers and system administrators to diagnose, identify and resolve the problem that led to application or system failure. However, in cases where the underlying resources being utilized are those offered by CSPs, the guest operating system may not be programmed to persistently store the memory dump in a virtualized environment. Thus, the intermediary guest manager may detect an application or system failure, create the memory dump, encrypt the memory dump, and send the encrypted memory dump to a secure location where the memory dump may later be retrieved by a software developer or systems administrator. The step of encryption is not strictly necessary, but is often a sensible precaution when sending contents of memory which may contain sensitive information. Furthermore, memory dumps are also helpful in the event of a security breach, which enables a forensic analysis. In this case the memory dump acts as a snapshot of the system allowing security operations to determine how the system was breached and potentially identify the party or parties involved in the breach so that holes in security can be located and plugged.

In order to detect the application or system failure, the intermediary guest manager may intercept system calls, interrupts, or other signals/commands from the guest operating system which are indicative of a failure occurring. The exact set of criteria used to determine that a crash has occurred and a memory dump needs to be collected may depend on the guest operating system being used and/or the application which caused the error and may differ between embodiments. A threat defense policy may be defined which has one or more records with criteria that is met when errors and/or crashes are detected from the guest operating system and the remedial action taken in response may be to collect and secure the memory dump. As a result, the software developer and/or system administrator diagnosing and debugging problems with the guest operating system receives the technical benefit of having access to memory dumps that otherwise would not be available. Furthermore, some embodiments may force a memory dump in response to conditions which may not normally constitute "critical" errors, but rather serious security breaches. For example, a process attempting to write to a read-only file that stores the passwords for users of the guest operating system may trigger a memory dump in addition to other actions such as notifying an administrator and stopping the instance of the guest OS on the virtual machine.

In some embodiments, the services provided by the intermediary guest manager are transparent to the hypervisor and/or the guest operating system. Thus, hypervisors and/or guest operating systems used in conjunction with the techniques described herein may be used "out of the box" with minimal or no modification being required. For example, the intermediary guest manager may install traps into the guest operating system to obtain control of execution under various conditions, such as the handling of a system call, but may not require the underlying logic of the guest operating system or the hypervisor to be aware of the presence of the intermediary guest manager.

2.0 Example Operating Environment

Figure 1:
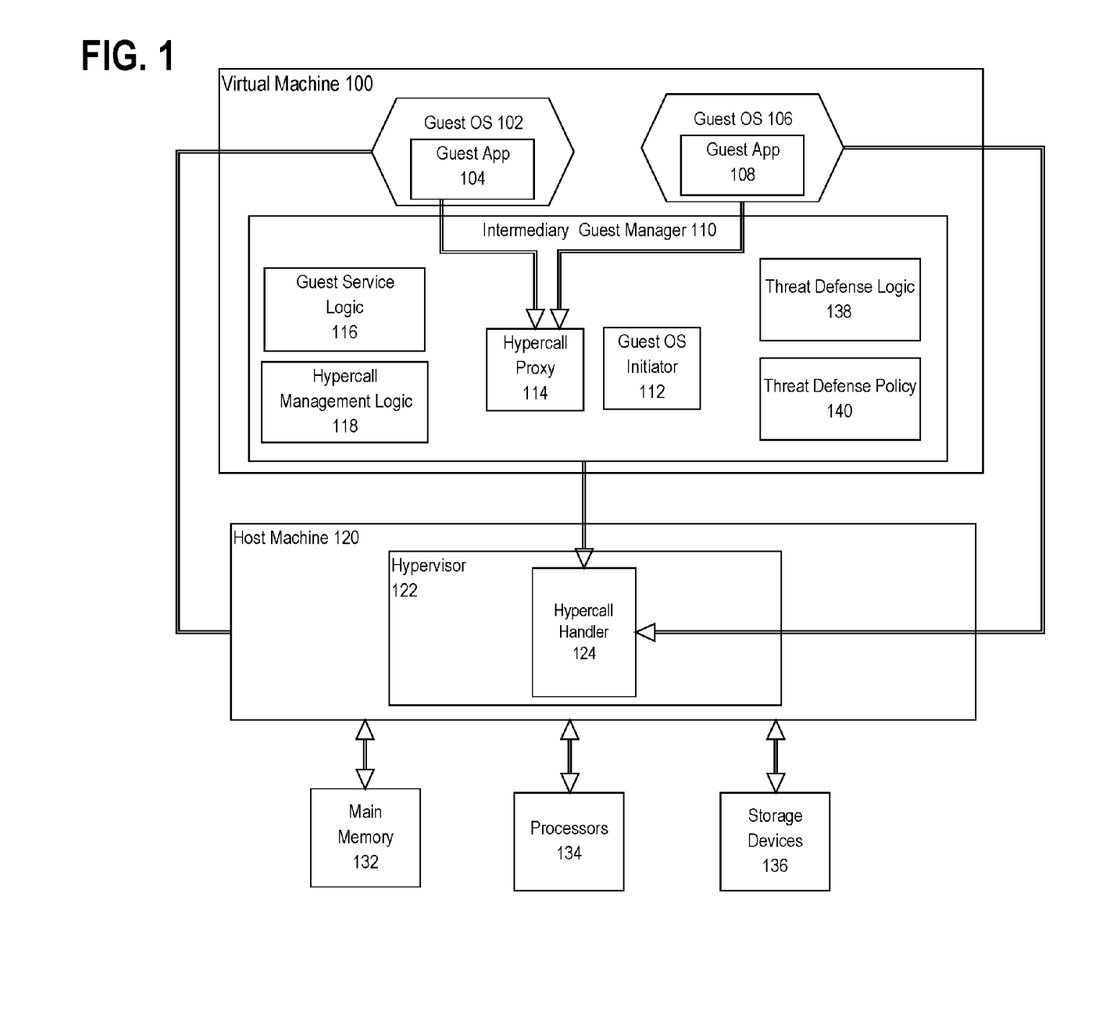
FIG. 1 illustrates an example networked computer system arrangement that may be used to implement an embodiment.

FIG. 1 illustrates an example networked computer system arrangement that may be used to implement an embodiment. Virtual machine 100 is a virtual machine hosted by host machine 120 and managed by hypervisor 122. Guest OS 102, 106 are guest operating systems within virtual machine 100. Guest OS 102, 106 may utilize hardware resources of host machine 120 or other VDC-provided resources. Resources of host machine 120 may be virtualized for a single guest, virtual machine 100, at least partially with the assistance of hypervisor 122. Guest OS 102 and 106 may not be separate virtual machines. For example, there may be no CPU virtualization, strict memory segmentation, or memory protection between guest OS 102 and 106. Other embodiments may include only a single guest operating system or may include more than two guest operating systems.

Guest OS 102 and 106 comprise guest applications (guest app) 104 and 108. In some embodiments, guest applications 104, 108 may represent security agents executing within guest OS 102, 106 respectively. A client may control processes on guest OS 102 and 106 such as guest apps 104 and 108, at a client location that is remote from the location of host machine 120. Guest apps 104, 108 may initiate various hypercalls and/or various system calls. Hypercalls, as used herein, include requests directed to hypervisor 122 of host machine 120, such as requests to access main memory 132, processors 134, storage devices 136, and request to utilize various VDC-provided resources such as VDC storage resources, VDC database resources, and VDC computing resources. System calls, as used herein, include requests by applications of guest OS 102 and 106 (such as guest applications 104 and 108) to start up processes, terminate processes, perform file reads and/or writes, access the scheduler, access network resources, and so forth. A system call is a programmatic way in which applications/computer programs request a service from the kernel of the OS upon which they are executing. However, in this case, rather than being executed solely by the guest OS, the system calls may be intercepted by the intermediary guest manager 110.

Hypercalls generally require the guest OS to have knowledge of the virtualized environment and thus be configured to make hypercalls to the hypervisor 122. In FIG. 1, guest OS 102, 106 are assumed to have the capability of issuing hypercalls directly to the hypervisor. However, in other embodiments, guest OS 102, 106 may not be paravirtualized and therefore not aware of the virtualized environment. As a result, the guest OS may not be able to make hypercalls. Instead, in such environments, the intermediary guest manager 110 intercepts the system calls made by the guest applications 104, 108 through the use of traps and then emulates the effect of those system calls by making hypercalls to the hypervisor 122, emulating the system call itself, or a combination of both. Furthermore, in some embodiments, the intermediary guest manager 110 may intercept system calls and hypercalls of even a paravirtualized guest OS. For example, there may be cases where the hypervisor is configured to assume that guest OS 102, 106 are not aware of the hypervisor and do not make hypercalls. In such embodiments, the intermediary guest manager 110 may intercept the hypercalls made by the guest OS 102, 106 and emulate those hypercalls by performing the task itself or converting the hypercalls to a communications format expected by the hypervisor 122. As another example, the intermediary guest manager 110 may be configured to provide optimizations which require the system calls and hypercalls to be intercepted and processed before being forwarded (potentially after being transformed and/or aggregated) to the hypervisor 122. In addition, intercepting the system calls and/or hypercalls allows the intermediary guest manager 110 to implement features which otherwise would not be available to the guest OS through the hypervisor 122, such as the security features described herein.

Guest OS 102, 106 may be managed, at least in part, by intermediary guest manager 110. Intermediary guest manager 110 may comprise logic for enhancing security of guest OS 102, 106. Intermediary guest manager 110 may include one or more of guest OS initiator 112, hypercall proxy 114, guest service logic 116, hypercall management logic 118, threat defense logic 138, and threat defense policy 140. Guest OS initiator 112 initiates guest operating systems, such as guest OS 102, 106. Hypercall proxy 144 intercepts hypercalls from guest app 104 or guest app 108 that may be directed to hypervisor 122. Guest service logic 116 comprises instructions for performing one or more guest services that enhance guest utilization of VDC resources. Hypercall management logic 118 comprises instructions for managing hypercalls, such as instructions for ensuring that utilization of memory by guest OS 102, 106 does not interfere with utilization of memory by intermediary guest manager 110. Threat defense logic 138 comprises instructions for analyzing communications from guest OS 102, 106 and applications executing on guest OS 102, 106 (such as guest applications 104, 108) for suspicious behavior and performing remedial actions if suspicious behavior is detected. Threat defense policy 140 represents a data structure or database of threat defense records, where each record includes a set of criteria representing a trigger and one or more remedial actions to perform in response to the trigger. The threat defense policy 140 is consulted by the threat defense logic 138 to determine whether a request, such as a system call or page table access, is suspicious and requires remedial action.

The guest service logic 116 and the threat defense logic 138 in an abstract sense perform similar functions. The primary difference between the two components in the example of FIG. 1 for the purpose of the following explanations is that guest service logic 116 represents the logic for expanded services which do not pertain to security services whereas threat defense logic 138 represents the logic for services which pertain to security for guest OS 102, 106. However, other embodiments may combine both of these components, or may divide these components out into multiple sub-components. For example, the logic contained within the threat defense logic 138 may be divided into the logic that pertains to different categories of threats and spread across different components, such as components that handle the processing of system calls, page table updates (e.g. memory management unit components), and so forth.

Intermediary guest manager 110 may operate on a different type of operating system than guest OS 102 and/or guest OS 106. Guest OS 102 and 106 may also be different types of operating systems in some embodiments.

Hypervisor 122 within host machine 120 may comprise hypercall handler 124. Hypercall handler 124 may receive calls from guest OS 102, 106 and/or intermediary guest manager 110. Host machine 120 may be communicatively coupled to main memory 132, processors 134, and/or storage devices 136. Guest app 104, 108 within guest OS 102, 106 may utilize main memory 132, processor 134, and/or storage devices 136. Hypercalls handled by hypercall handler 124 may request utilization of main memory 132, processors 134, and/or storage devices 136.

Hypervisor 122 of FIG. 1 may present a software interface for communicating various hypercalls to the hypervisor, which may be used by processes within virtual machine 100. For example, hypervisor 122 may be a XEN hypervisor and guest OS 102, 106, and/or intermediary guest manager 110 may issue hypercalls to hypervisor 122 by sending a hypercall. XEN is currently developed by the Xen.org community.

Hypervisor 122 may not be notified of the separate guest operating systems within virtual machine 100 and may not sub-partition virtual machine 100 resources to create separate partitions for intermediary guest manager 110 or and/or other guest operating system(s). Hypervisor 122 may interpret calls received from the plurality of guest operating systems and/or from intermediary guest manager 110 to be from a single guest through the manipulation of the intermediary guest manager 110.

3.0 Threat Defense Policy

Figure 2:
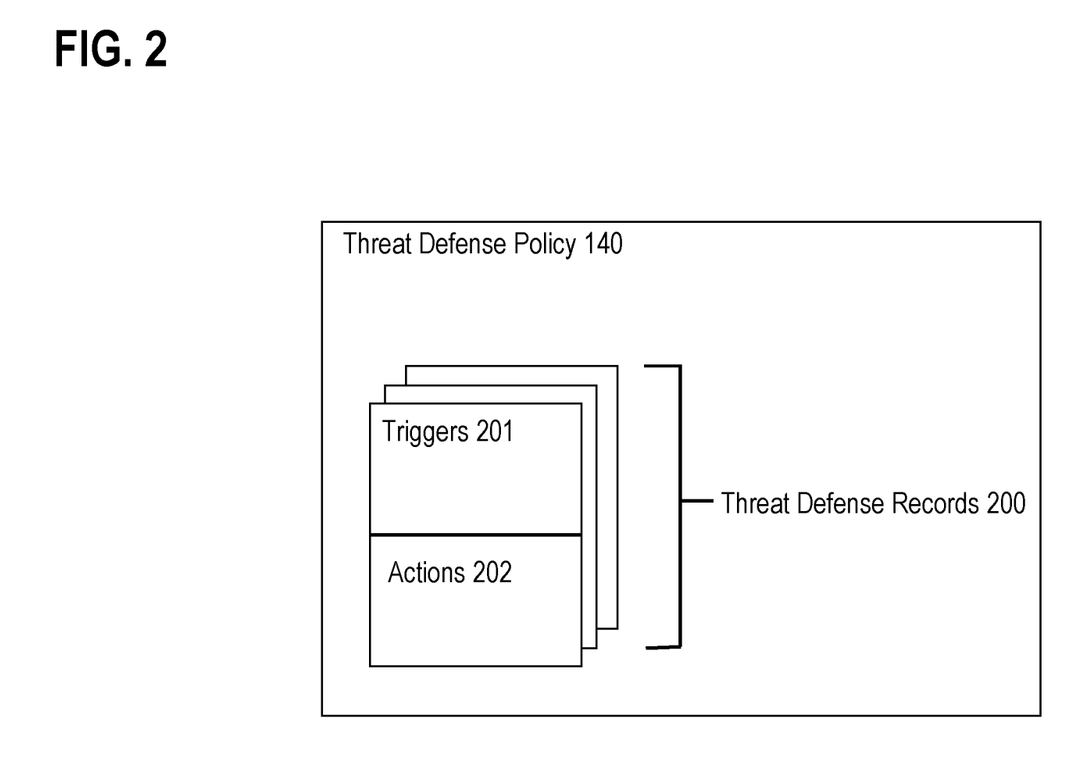
FIG. 2 illustrates an example logical layout of a threat defense policy according to an embodiment.

FIG. 2 illustrates an example logical layout of a threat defense policy according to an embodiment. In FIG. 2, threat defense policy 140 includes a number of threat defense records 200, each record includes one or more triggers 201 and one or more actions 202 to take in response to being triggered.

In an embodiment, the threat defense policy 140 represents a data structure or database utilized by the threat defense logic 138 of the intermediary guest manager 110 to determine whether a request from guest OS 102, 106 or an application executing thereon is suspicious. Although in FIG. 1 the threat defense policy 140 is depicted as being stored within the intermediary guest manager 110 and is therefore a part of virtual machine 100, the threat defense policy 140 may in other embodiments be stored in a separate control plane that is outside of the intermediary guest manager 110 and/or the virtual machine 100. The data structure used to store the threat defense policy 140 is not critical and may take the form of a simple data structure, such as a linked list, or may even take the form of a database, such as a flat-file database, relational database, object-relational database, and so forth. The exact manner and format in which the threat defense policy 140 is stored is not critical to the techniques discussed herein and may vary from embodiment to embodiment.

In some embodiments, the threat defense policy 140 may be specific to a given guest OS, the applications expected to be executed on the guest OS, and/or the client upon whose behalf the guest OS is being spun up on the virtual machine. The threat defense policy 140 may be loaded on a per-guest OS or per-client basis at the time the guest OS is started up in the virtual machine 100. For example, the host machine 120 or a remote machine may contain a database of threat defense policies that are unique to each guest OS or each client upon whose behalf a guest-OS is initiated. Upon being started up, the threat defense logic 138 pulls the records from the associated policy and uses those records to evaluate requests originating from that guest OS.

Many of the security issues discussed above are specific to the type of guest operating system that the intermediary guest manager 110 monitors. For example, the location of sensitive data structures, such as the location of the system call table, for each operating system may differ. Thus, when a guest OS is booted up by the guest OS initiator 112, the offset from the region of memory assigned to that guest OS to where the system call table resides may differ depending on whether the guest OS is Linux, Window, Unix, and so forth. As a result, the threat defense policy 140, or at least records pertaining to specific types of requests, may need to be tailored to the type of operating system being utilized by guest OS 102, 106. For example, there may be different threat defense policies for each type of operating system or the triggers 201 may include criteria that limits particular records of the threat defense records 200 to only apply to requests from specific types of guest OS. In addition, each guest OS upon being initialized in the virtual machine 100 may be assigned an identification number associated with a particular client, which may also be used as one of the criteria for the triggers 201 of a record of the threat defense policy 140.

In addition, there are some security issues that are specific to the types of applications which execute on the guest operating systems monitored by the intermediary guest manager 110. For example, the intermediary guest manager 110 may implement system call filtering that prevents processes representing security agents from being terminated. However, when a system call is received that terminates a process, that process is identified by process ID. The process ID is assigned at the time the process is started and therefore may not be static between executions. As a result, the record may not be able to simply specify that system calls that would terminate a process with a specific static ID are blocked. Instead, the threat defense logic 138 may identify when the security agent is initially executed and then track the process ID assigned to the process implementing the security agent by generating a new record for the threat defense policy 140 at that time. This new record would then persist for as long as the security agent is running and may be modified in cases where the process forks to track the child processes.

Processes are initially started up by system calls, thus the threat defense records 200 may include an initial record that is triggered based on arguments of a system call which starts up a process and is known to correspond to the security agent. The triggers 201 in this case may include the known path of the executable of the security agent. For a given security agent this path may be known, but the path is likely to differ between different security agents. Thus, the threat defense policy 140 may need to be customized for the specific security agent(s) that a client may desire to execute on guest OS 102, 106 to ensure that those specific security agents are protected. The same concept also applies to collecting secure memory dumps, where the threat defense records 200 which implement the secure memory dump feature may be set to trigger only from errors encountered from specific applications which the client desires to monitor for debugging purposes.

The actions taken in response to a record becoming triggered may vary greatly depending on the threat defense policy 140 set in place for a particular client and also the gravity of the threat that is detected. For example, some threats which may be considered lesser in nature or having indications that the issue is one that requires manual intervention by an administrator may be handled by sending a notification (e.g. through email, text message, or other means of communication) to an administrator without any further action being taken. Other more severe threats may be remediated by stopping the guest operating system entirely, performing a reboot, booting to the last saved image of the guest OS, and so forth. Other possible remediation steps may be to simply ignore the request (e.g. discard the system call without emulating its functions). This may be followed by returning a negative acknowledgment to the process that issued the request. However, in other embodiments, the actions 202 may be configured to respond with a positive acknowledgment, essentially tricking a malicious program into believing that the task has been performed. For example, a malicious program may continue to reissue the same system call continuously until a positive acknowledgement is returned, which may inundate the intermediary guest manager 110 with many requests that are ultimately ignored. By responding with a positive acknowledgment, a malicious process might cease to continue to issuing the same system call, but without successfully having the system call executed. In some embodiments, the triggers 201 may include a counter and actions 202 which return a positive acknowledgment if the same process attempts the same request which triggers the ignore action a threshold number of times.

4.0 Example Threat Defense Process Flow

Figure 3:
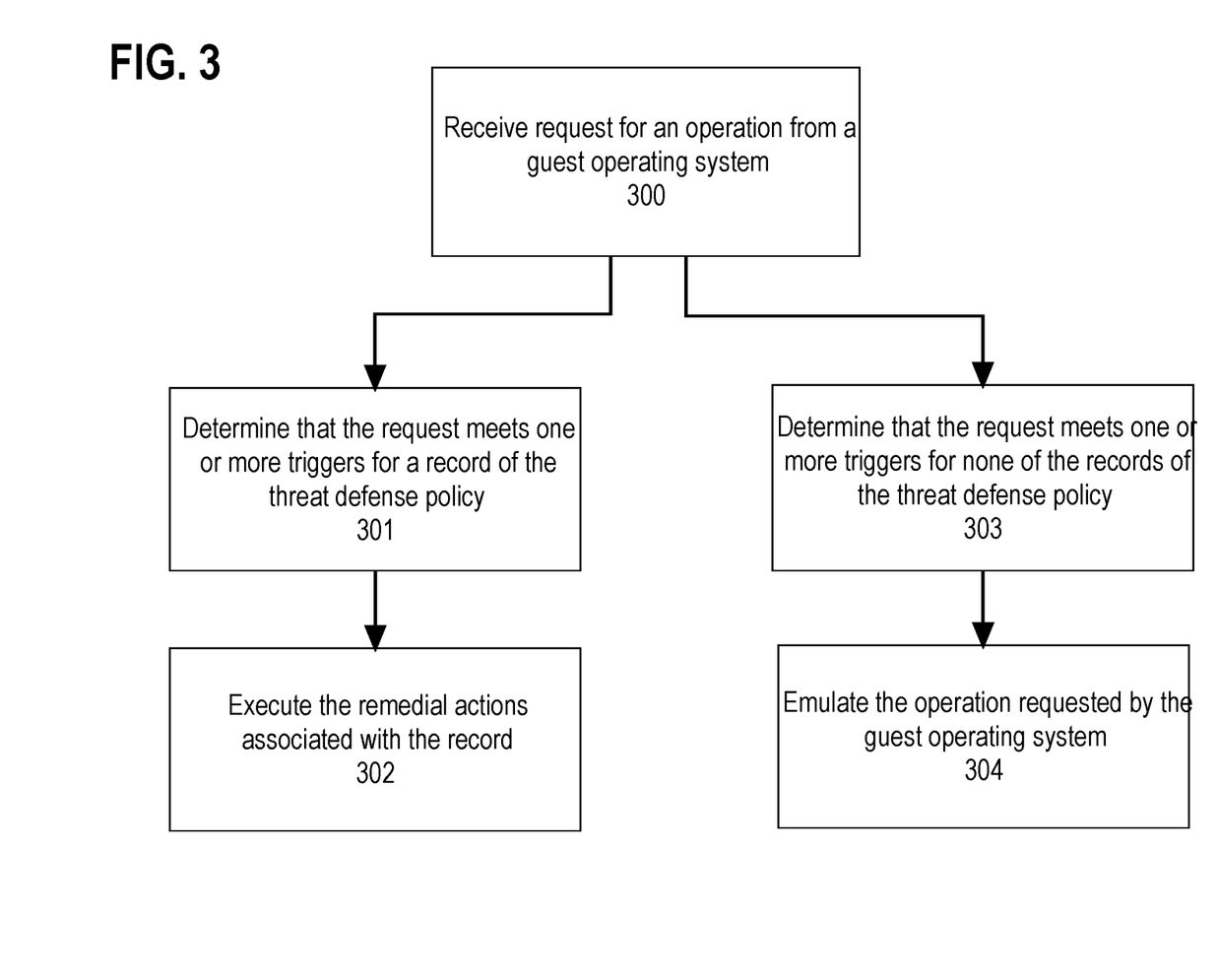
FIG. 3 illustrates an example process flow for identifying and remediating threats in block diagram form according to an embodiment.

FIG. 3 illustrates an example threat defense process flow in block diagram form according to an embodiment. Although FIG. 3 is illustrated using a specific number of logical blocks, other embodiments may merge the logical blocks into a smaller set of blocks or divide out the illustrated blocks by sub-dividing the tasks represented by the blocks. Furthermore, other embodiments may use the process depicted in FIG. 3 as part of a larger process and thus may include additional blocks that are not explicitly illustrated in FIG. 3. The description of FIG. 3 below assumes that the steps represented by the blocks are performed by the threat defense logic 138 of the intermediary guest manager 110. Furthermore, the description below assumes the request is received from guest OS 102. However, the process flow of FIG. 3 also applies to requests received from guest OS 106 and any other guest OS that may be executing within the virtual machine 100.

At block 300, the threat defense logic 138 receives a request for an operation from guest OS 102. The term "request" as used herein is an umbrella term that covers requests for operations including but not limited to system calls, hypercalls, page table update requests, file access requests, scheduling requests, and so forth. Furthermore, in cases where the request is described as being received "from" guest OS 102, 106 this also includes cases where the request is issued by applications executing in the context of guest OS 102, 106 (such as guest applications 104, 108) and are intercepted by the intermediary guest manager 110. The interception, as described above, may be accomplished by configuring traps in the guest OS 102 that cause execution to switch context to the intermediary guest manager 110 in response to various conditions, such as the issuance of a system call or a page table update.

After receiving the request from the guest OS 102 the threat defense logic 138 performs a branch depending on whether or not the request meets one or more of the triggers 201 for a record of the threat defense policy 140. Blocks 301-302 represent the case where the request meets one or more of the triggers 201 of the record and the request is therefore suspicious. Blocks 303-304 represent the case where the request does not meet the one or more triggers 201 for any of the records and is therefore not suspicious. Although blocks 301-302 are described in reference to a singular record, there may be cases where the request triggers more than one record defined within the threat defense policy 140. In such cases, the steps of blocks 301-302 may be repeated for each triggered record. Alternatively, in some embodiments, the first record encountered which is triggered may end the algorithm illustrated by FIG. 3 after performing the remedial actions 202 at block 303 for that first triggered record.

At block 301, the intermediary guest manager 110 determines that the request meets one or more of the triggers 201 for a record of the threat defense policy 140. In an embodiment, the intermediary guest manager 110 iterates through the threat defense records 200 of the threat defense policy 140 and checks the request against the one or more triggers 201 for each record. If the request meets the criteria for at least one trigger of the record, then the determination at block 301 has been made. Each trigger may include multiple parts, such as requiring particular logical conjunctions/disjunctions of criteria. In some embodiments, rather than iterating through all the threat defense records 200 of the threat defense policy 140, the records may be categorized or grouped by type. For example, certain records may only apply to certain types of requests, such as records which apply only to page table updates, records which apply only to system calls that access files, records which apply only to system calls which terminate a process, and so forth. As a result, the intermediary guest manager 110 may skip the consideration of records which are not grouped into the category relevant to the type of request received at block 300 as an optimization.

At block 302, in response to determining that the request meets one or more triggers 201 for a record of the threat defense policy 140, the intermediary guest manager 110 executes the remedial actions 202 associated with the record. Depending on the actions 202 associated with the record, remediation may include ignoring the request, sending a notification, stopping the guest OS 102 from executing, reverting the guest OS 102 to a backup image, sending a negative or positive acknowledgment, generating a memory dump, and so forth. In some less severe cases, such as when the only remedial action associated with the record is to notify but take no substantive action, the actions may also include proceeding to block 304 and emulating the requested operation.

At block 303, the intermediary guest manager 110 determines that the request meets one or more triggers 201 for none of the threat defense records 200 of the threat defense policy 140. In an embodiment, block 303 represents the case where the intermediary guest manager 110 has iterated through the threat defense records 200 and has found no record that is triggered by the request received at block 300. As discussed above, the iteration may be optimized by skipping the consideration of records which are not applicable to the type of request received at block 300.

At block 304, the intermediary guest manager 110 emulates the operation requested by the guest OS 102. In an embodiment, the intermediary guest manager 110 emulates the operation by performing the operation itself (e.g. if the operation is a page table update, updating the page table on its own), emitting hypercalls to the hypervisor 122 via the hypercall management logic 118, or combinations thereof.

5.0 Threat Defense Examples

The following are a few examples of security features that may be implemented using the techniques discussed herein. There is no requirement that any particular embodiment implement all or any of the provided example features.

5.1 System Call Filtering

In some embodiments, the threat defense logic 138 implements system call filtering. System call filtering is a feature that inspects system calls emitted by applications executing on guest OS 102, 106 (such as guest applications 104, 108) and then takes remedial action if the system call is found to be suspicious. For example, a remedial action taken in response to a suspicious system call may be to ignore the system call. However, other embodiments may return a false positive acknowledgement or even continue to emulate the system call while sending a notification to an administrator. To determine if a process is suspicious the arguments to the system call may be inspected, which may include identifiers related to the operation of the system call (as defined by the system call table of guest OS 102, 106 respectively), the path of files or executables utilized by the system call (e.g. path of an executable to use to start up a process, a file to open for reading/writing, etc.), network information such as IP/port address assuming the system call accesses network resources, and so forth. For records of the threat defense policy 140 that pertain to system call filtering the one or more triggers 201 may be met when the arguments to the system call meet a particular set of criteria, such as a system call with an argument indicating a process termination operation and another argument specifying a process ID associated with a security agent.

Furthermore, in some cases, suspicious activity may be found by combinations of system calls, rather than a single system call received in a vacuum. For example, the threat defense policy 140 may have a record with one or more triggers 201 that represent a sequence of system calls that indicate suspicious behavior (potentially with each system call in the sequence being subject to one or more criteria to meet a trigger, such as having particular types of arguments). In such embodiments, the threat defense logic 138 may maintain a log of system calls received from each of the guest operating systems and may, for a given record, compare the last N system calls to the sequence that would trigger the record. In addition, other embodiments may allow for "out-of-order" matching, where the log may compare K system calls out of the last N received system calls to check whether those K system calls trigger the record. As a result, a strict ordering on the system calls being received is not required and the sequence may be "broken up" by intermediate system calls which are not suspicious.

Within system call filtering there are a few example types of system call filtering that may be implemented. However, system call filtering is not limited to the following described examples. First, system call filtering may be implemented to protect sensitive processes, such as processes representing security agents that should not be terminated. Second, system call filtering may be used to restrict access to protected files. Finally, system call filtering may be used to prevent abuse of the scheduler of guest OS 102, 106.

In reference to protecting sensitive processes, the one or more triggers 201 associated with the record of the threat defense policy 140 may be set based on arguments of the system call, such as an argument identifying indicating the system call is an operation to terminate a process and another argument specifying a process ID of a known security agent. For example, the record may have a listing of process IDs of known security agents and is triggered if a system call is received to terminate a process with any of the listed process IDs. However, process IDs are assigned at the time the process is started up and therefore is not a static identifier across executions. As a result, the record identifying the process ID of a security agent may be generated in response to a security agent being executed on guest OS 102, 106. For example, the threat defense policy 140 may have one or more initial records that store the path of the executable used for known security agents and which are triggered when a system call is received to start up a process that includes that path as one of the arguments. In the process of emulating the system call, the intermediary guest manager 110 becomes aware of the process ID assigned to the security agent. That process ID can then be used to generate a record that is triggered when a system call is received which would attempt to terminate a process with that process ID. As a result, even though the process ID assigned to the security agent is dynamic, the intermediary guest manager 110 can still track the process ID of the security agent and know when a system call is received that would attempt to disable the security agent. Furthermore, in cases where the process executing the security agent is forked, the record may be modified to include the process IDs of the children to ensure that the child processes are likewise protected.

In reference to restricting access to protected files, the one or more triggers 201 associated with a record of the threat defense policy 140 for protecting files may be set based on arguments indicating the opening of a file (e.g. for read or write access depending on the restriction) and another argument indicating the path of a protected file. In some embodiments, the threat defense policy 140 may be initially written by an administrator to include the path of the files that would need to be protected. For instance, the one or more triggers 201 for the record may include opening for write access any file that is on a list of protected paths. However, other embodiments may set the one or more triggers 201 based on characteristics of the files being opened, such as files with a name that has a specific pre-fix or post-fix that the threat defense policy 140 defines as being protected. Although the file systems of guest OS 102, 106 may institute their own protections on files, in the case of penetration by malicious agents the operating systems are not capable of defending themselves from an actor with sufficient permissions. However, since the intermediary guest manager 110 exists outside guest OS 102, 106, it can impose these restrictions regardless of the permissions obtained by a user within guest OS 102, 106.

In reference to protecting the scheduler of the operating system, the one or more triggers 201 associated with a record of the threat defense policy 140 may be set based arguments indicating a system call that changes priority within a scheduler for a process and an argument indicating a process ID that should not be set to the indicated priority. For example, if a malicious program is unable to terminate a security agent, the malicious program may instead attempt to get the security agent to run at such a low level of priority that its scans would slow to a crawl. As a result, the threat defense policy 140 may have a record that specifies the process ID of security agents and specifies a minimum priority that the security agent has within the scheduler of guest OS 102, 106. If a system call is received that attempts to move the process belonging to a security agent below the minimum priority, the associated actions 202 are triggered. As discussed above, system calls typically identify processes by process ID which is not static across executions. Thus, as discussed above in reference to protecting security agents from being terminated, the records may be generated in response to a security agent (or other sensitive program) being executed and assigned a process ID.

5.2 Memory Protection

In some embodiments, the threat defense logic 138 implements memory protections for sensitive data structures of guest OS 102, 106. For example, sensitive data structures may include the system call tables of guest OS 102, 106 respectively which is often a target of rootkits and other malware looking to hide from security agents. However, this feature is applicable to any region of memory or data structure that should not be overwritten. While guest OS 102, 106 may have their own memory protections, most (if not all) operating systems cannot protect themselves from a user that has sufficient permissions. Thus, if a malicious program obtained kernel-level access, the protections the operating system has to protect such sensitive data structures may not be adequate. However, since the intermediary guest manager 110 exists outside of guest OS 102, 106, it can enforce memory protections even when guest OS 102, 106 are severely compromised.

In order to protect sensitive regions of memory or data structures the threat defense logic 138 may impose restrictions on page table updates. A page table is a data structure used by a virtual memory system in a computer operating system that maps between virtual addresses and physical addresses. Virtual addresses are the addresses that are typically seen by processes, whereas the physical addresses are used by hardware, such as the RAM subsystem. In operating systems that use virtual memory, each process is given the impression that it is working with large, contiguous sections of memory. However, physically the memory being accessed may be dispersed across different areas of physical memory or across different types of storage. It is typically the task of the operating system to map the virtual address provided by the process to the physical address of the actual memory where the data is stored. This mapping is what is represented in the page table. However, in this particular case, the intermediary guest manager 110 subsumes the responsibility of guest OS 102, 106 through the use of traps and manages the page table itself.

When a request to update the page table comes in, such as to write virtual memory address which will translate to an update of the corresponding physical address, the intermediary guest manager 110 has an opportunity to review that operation before carrying out the update. Thus, the threat defense policy 140 may include records that trigger when a page table update is received which would map to a physical address that is known to hold a sensitive data structure. For example, a record may include one or more ranges of virtual memory addresses known to correspond to the physical locations of sensitive data structures relied upon by guest OS 102, 106. As a result, if a page table update attempts to make writable any block of memory within those ranges, that page table update can be ignored or another remedial action may be taken.

One complication is that the region of memory used by a guest OS (such as guest OS 102, 106) is determined at the time the guest OS is booted up by the guest OS initiator 112. Before that point, the region of memory assigned to a particular guest OS may not be known. As a result, the threat defense policy 140 may not be able to designate a static range of memory addresses which are protected. Instead, when the guest OS initiator 112 boots up a guest OS, the region of memory assigned to that guest OS is communicated to the threat defense logic 138. The threat defense logic 138 then consults metadata within the threat defense policy 140 that determines where the sensitive data structures should be located based on the memory region assigned to the guest OS by the guest OS initiator 112. For example, the metadata may specify that the data structures are at regions which are a static offset from an initial start memory address assigned to the guest OS by the guest OS initiator 112. In response to determining the ranges of memory corresponding to the sensitive data structures, the threat defense logic 138 then generates records which are triggered when a request is received to update any data block within those ranges.

5.3 Secure Memory Dump

In some embodiments, the threat defense logic 138 implements a secure memory dump feature for guest OS 102, 106 that allows administrators to collect information used to diagnose and debug issues with the guest operating systems and applications executing within the virtual machine 100. Ordinarily the hypervisor 122 is not configured to collect memory dumps in case of an error. Even if guest OS 102, 106 were configured to collect memory dumps, there is no guarantee that those memory dumps would persist after their instance within the virtual machine 100 has been shut down.

In order to ensure the memory dumps are collected, the intermediary guest manager 110 may have a threat defense policy 140 that triggers upon detecting an error originating from guest OS 102, 106 (or an application executing thereon) and causes remedial actions to be taken which include storing a memory dump comprising the working state of memory accessible to the failing operating system in a location where the memory dump may later be retrieved. For example, this may be a persistent memory location of the host machine 120 or may involve a transfer over a network to a remote machine. Furthermore, memory dumps may contain sensitive information, such as passwords that are still found within the working memory of the guest OS at the time the memory dump was taken. As a result, some embodiments may as a precaution encrypt the memory dump (e.g. using an encryption protocol such as RSA, Triple DES, Blowfish, AES, and so forth) prior to storing or transferring the memory dump.

In some embodiments, the threat defense policy 140 includes a record that has one or more triggers 201 based on detecting an error thrown by guest OS 102, 106 (or an application executing thereon) and has actions 202 which collect/store/transfer the memory dump (with optional encryption). In some embodiments, the record may have triggers 201 that are set to look out for particular types of errors or errors originating from particular processes. Furthermore, memory dumps may be triggered by circumstances which are not ordinarily considered critical errors.

For example, the system call filtering feature technique described above may detect an attempt to write to a file that contains the passwords of users for a guest OS. The actions 202 taken in response to detecting such a system call may be to stop the guest OS, notify an administrator, and take a memory dump for later analysis. Thus, memory dumps may also be taken as a means of forensic analysis in cases where the guest OS is suspected to be compromised by malware.

6.0 Alternative Security Agent Design

Figure 4:
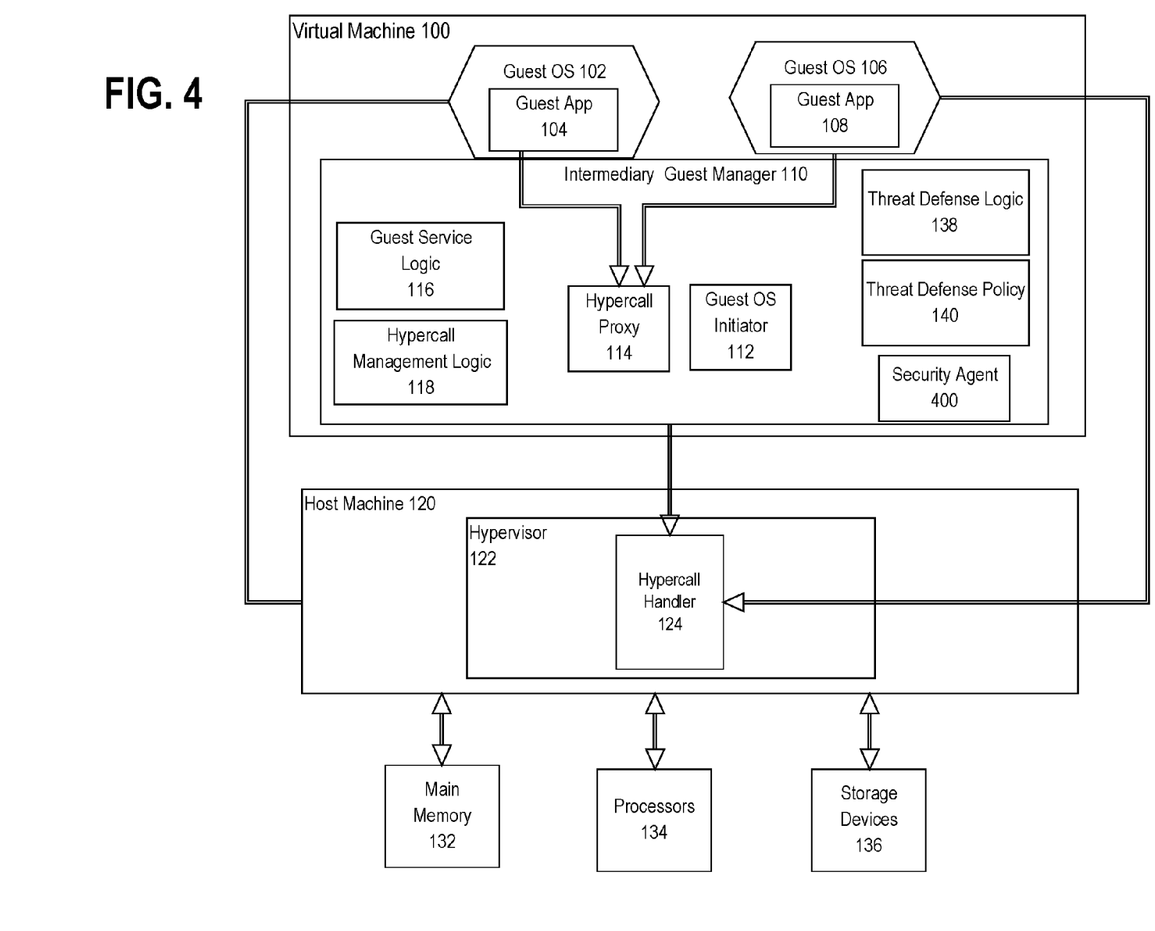
FIG. 4 illustrates an alternative arrangement for a networked computer system where a security agent is integrated into an intermediary guest manager according to an embodiment.

FIG. 4 illustrates an alternative arrangement for a networked computer system where a security agent is integrated into an intermediary guest manager according to an embodiment. FIG. 4 is essentially the same arrangement as the example embodiment depicted in FIG. 1, with the exception that a security agent 400 is integrated into the intermediary guest manager 110 rather than potentially being one of the guest applications 104, 108 executing within guest OS 102, 106 respectively. As a result, the explanations provided above in Section 1.0 "Example Operating Environment" for a component in FIG. 1 is also applicable to the corresponding component in FIG. 4.

The arrangement in FIG. 1 assumes that security agents (if installed) are installed on guest OS 102, 106. This has the advantage of allowing "out of the box" security agents to execute as-is without the need for significant (or any) modification in order to be protected by the intermediary guest manager 110. However, executing as part of guest OS 102, 106 also makes the security agents vulnerable, which is one of the issues tackled by the system call filtering feature discussed above. However, if the security agents were designed instead as an integrated part of the intermediary guest manager 110, as is the case with security agent 400, the security agent 400 is outside the control of any malicious process or program executing on guest OS 102, 106. Since the guest OS 102, 106 act as a sandbox, those malicious processes or programs may not be able to see beyond their own virtualized operating environment and therefore may be unaware of the existence of the security agent 400. As a result, the security agent 400 is essentially immunized from tampering by malicious users of guest OS 102, 106.

However, as a tradeoff, the security agent 400 must be aware of the environment of the intermediary guest manager 110 and configured to communicate directly with the various components of the intermediary guest manager 110 to collect information and inspect the behavior of guest OS 102, 106. For example, the intermediary guest manager 110 may have components which allow access to the files, memory, system call logs, and so forth for guest OS 102, 106 which the security agent 400 may need to access through one or more inter-process communication mechanics, such as an API provided by the intermediary guest manager 110. Furthermore, the security agent 400 may be unable to make system calls to perform tasks since it is no longer a part of guest OS 102, 106, but may be able to utilize the intermediary guest manager 110 to emulate the effect of system calls that the security agent 400 would otherwise need to perform. In the environment of FIG. 1, the security agents (executing as guest applications 104, 108) communicated indirectly with the intermediary guest manager 110 through the use of traps and other tools where the influence of the intermediary guest manager 110 was transparent. Thus, the security agents required little to no modification to scan for viruses, malware, rootkits, and so forth and provide its own protection features. In FIG. 4, by contrast, the security agent 400 may communicate with a memory management unit module, file system module, or other component of the intermediary guest manager 110 that keeps track of memory for guest OS 102, 106 to perform scans.

In embodiments such as FIG. 4, the threat defense logic 138 may share responsibilities with the security agent 400, each providing separate protections to guest OS 102, 106. However, in other embodiments, the role of the threat defense logic 138 may be subsumed by the security agent 400. Thus, in such embodiments, threat defense logic 138 may be merged with or replaced by security agent 400.

7.0 Implementation Mechanisms—Hardware Overview

Figure 5:
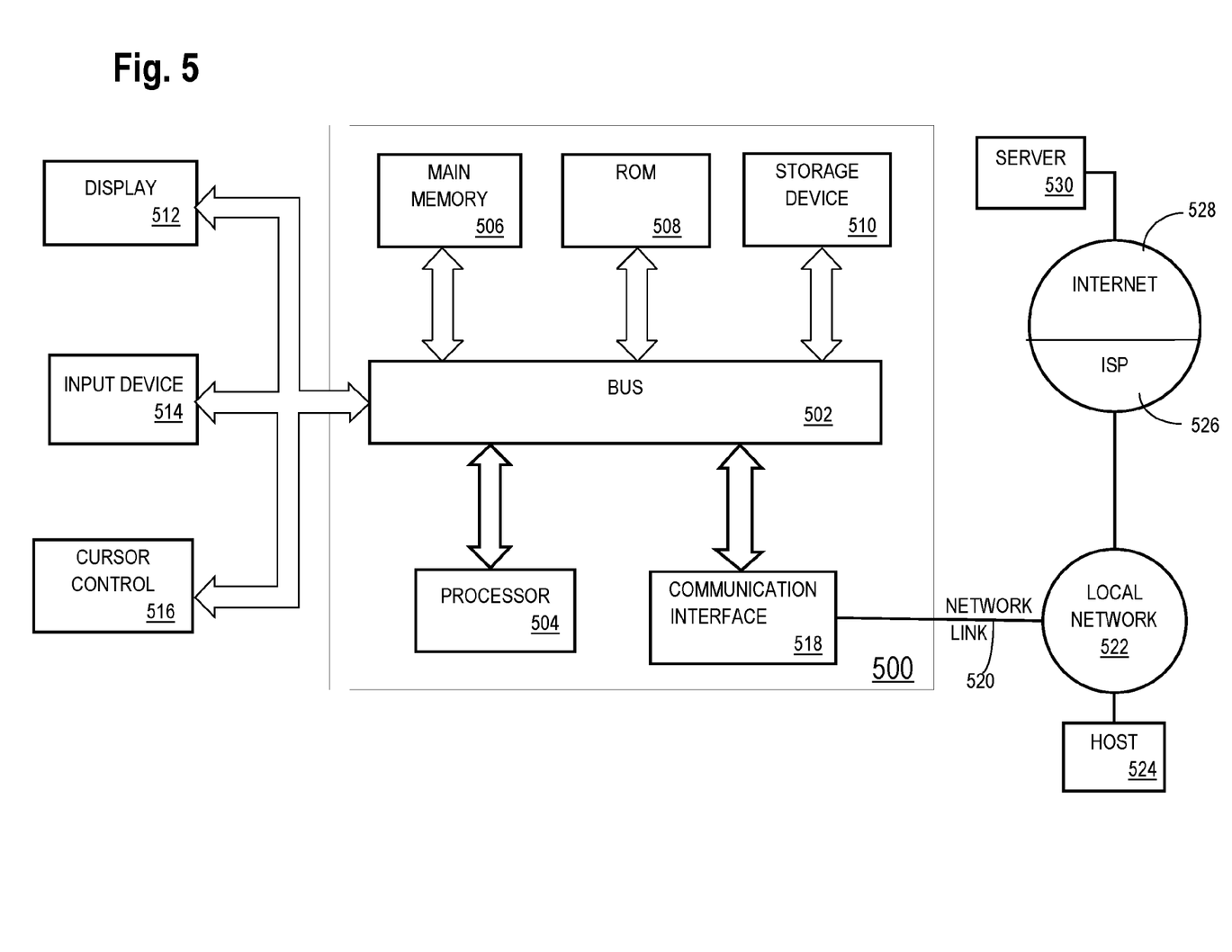
FIG. 5 is a block diagram that illustrates a computer system upon which an embodiment of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hardwired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to storage media and transmission media. Storage media includes both non-volatile media and volatile media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

8.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    receiving, at an intermediary manager executing via a virtual machine on a computer, a particular request from a guest operating system located at the same virtual machine as the intermediary manager, wherein the intermediary manager acts as an intermediary between the guest operating system and a hypervisor that is separate from the intermediary manager by intercepting one or more requests made by the guest operating system and then effectuating the one or more requests by invoking the hypervisor;
    in response to receiving the particular request, determining whether the particular request meets a particular threat response trigger of a plurality of threat response triggers defined within a threat defense policy, wherein each threat response trigger of the plurality of threat response triggers defined within the threat defense policy has a corresponding remedial action;
    in response to the intermediary manager determining that the particular request meets the particular threat response trigger, the intermediary manager performing the corresponding remedial action of the particular threat response trigger;
    in response to the intermediary manager determining that the particular request meets none of the plurality of threat response triggers, the intermediary manager invoking the hypervisor to effectuate the particular request.

2. The method of claim 1, wherein the particular request represents a system call to terminate a particular process executing on the guest operating system.

3. The method of claim 2, wherein the particular threat response trigger is met when the intermediary manager receives a system call to terminate a process executing on the guest operating system that has a process ID corresponding to a security agent.

4. The method claim 3, wherein the particular threat response trigger is initially defined within the threat defense policy by storing a process ID assigned to the security agent in response to the intermediary manager receiving a system call that causes the security agent to be executed; wherein the system call that causes the security agent to be executed is identified by one or more arguments that are defined by the threat defense policy.

5. The method of claim 1, wherein the particular request represents a page table update.

6. The method of claim 5, wherein the particular threat response trigger is met when the page table update attempts to update a protected region of memory of one or more protected regions of memory defined by the threat defense policy.

7. The method of claim 6, wherein the one or more protected regions of memory are initially defined by the intermediary manager when the guest operating system is booted by determining one or more locations of one or more sensitive data structures that the guest operating system relies upon.

8. The method of claim 1, wherein the intermediary manager includes a security agent that scans the guest operating system for malware.

9. The method of claim 1, wherein the request represents an error thrown by the guest operating system and the corresponding remedial action of the particular threat response trigger is to generate a secure memory dump and transfer the secure memory dump to a location external to the virtual machine.

10. The method of claim 1, wherein the particular request represents a write request to a file within a file system and the threat response trigger is met when the guest operating system attempts to perform a write operation on a set of protected files within the file system.

11. A non-transitory computer-readable storage medium storing one or more instructions which, when executed by one or more processors, cause the one or more processors to perform steps comprising:

receiving, at an intermediary manager executing via a virtual machine on a computer, a particular request from a guest operating system located at the same virtual machine as the intermediary manager, wherein the intermediary manager acts as an intermediary between the guest operating system and a hypervisor that is separate from the intermediary manager by intercepting one or more requests made by the guest operating system and then effectuating the one or more requests by invoking the hypervisor;

in response to receiving the particular request, determining whether the particular request meets a particular threat response trigger of a plurality of threat response triggers defined within a threat defense policy, wherein each threat response trigger of the plurality of threat response triggers defined within the threat defense policy has a corresponding remedial action;

in response to the intermediary manager determining that the particular request meets the particular threat response trigger, the intermediary manager performing the corresponding remedial action of the particular threat response trigger;

in response to the intermediary manager determining that the particular request meets none of the plurality of threat response triggers, the intermediary manager invoking the hypervisor to effectuate the particular request.

12. The non-transitory computer-readable storage medium of claim 11, wherein the particular request represents a system call to terminate a particular process executing on the guest operating system.

13. The non-transitory computer-readable storage medium of claim 12, wherein the particular threat response trigger is met when the intermediary manager receives a system call to terminate a process executing on the guest operating system that has a process ID corresponding to a security agent.

14. The non-transitory computer-readable storage medium of claim 13, wherein the particular threat response trigger is initially defined within the threat defense policy by storing a process ID assigned to the security agent in response to the intermediary manager receiving a system call that causes the security agent to be executed; wherein the system call that causes the security agent to be executed is identified by one or more arguments that are defined by the threat defense policy.

15. The non-transitory computer-readable storage medium of claim 11, wherein the particular request represents a page table update.

16. The non-transitory computer-readable storage medium of claim 15, wherein the particular threat response trigger is met when the page table update attempts to update a protected region of memory of one or more protected regions of memory defined by the threat defense policy.

17. The non-transitory computer-readable storage medium of claim 16, wherein the one or more protected regions of memory are initially defined by the intermediary manager when the guest operating system is booted by determining one or more locations of one or more sensitive data structures that the guest operating system relies upon.

18. The non-transitory computer-readable storage medium of claim 11, wherein the intermediary manager includes a security agent that scans the guest operating system for malware.

19. The non-transitory computer-readable storage medium of claim 11, wherein the request represents an error thrown by the guest operating system and the corresponding remedial action of the particular threat response trigger is to generate a secure memory dump and transfer the secure memory dump to a location external to the virtual machine.

20. The non-transitory computer-readable storage medium of claim 11, wherein the particular request represents a write operation to a file within a file system and the threat response trigger is met when the guest operating system attempts to perform a write operation on a set of protected files within the file system.

* * * * *